Nov. 17, 1936.   B. W. COLLINS   2,061,505
APPARATUS FOR PURIFICATION OF CAUSTIC HYDROXIDE
Filed Jan. 3, 1935   3 Sheets-Sheet 2
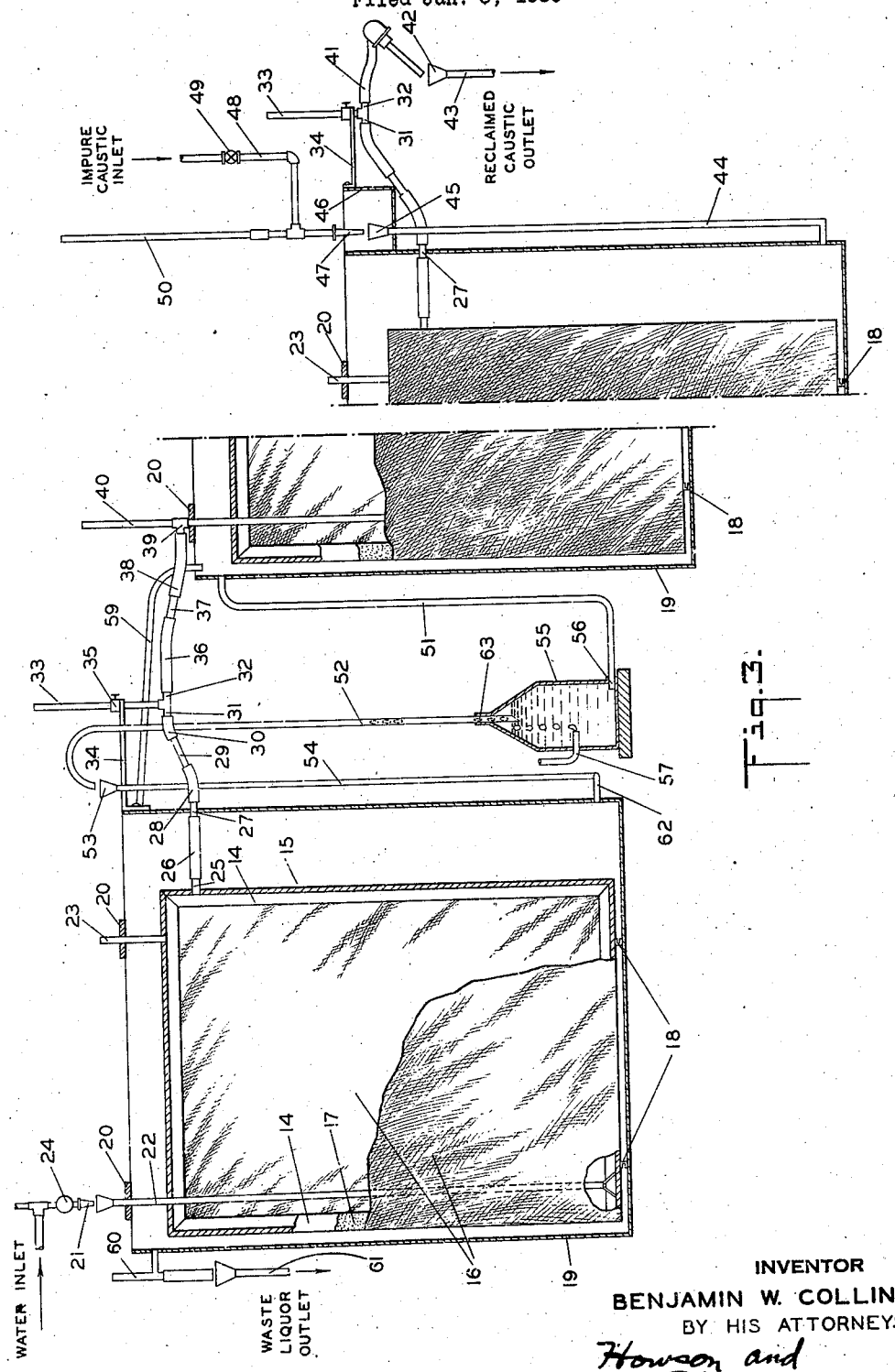
INVENTOR
BENJAMIN W. COLLINS
BY HIS ATTORNEYS
Howson and Howson

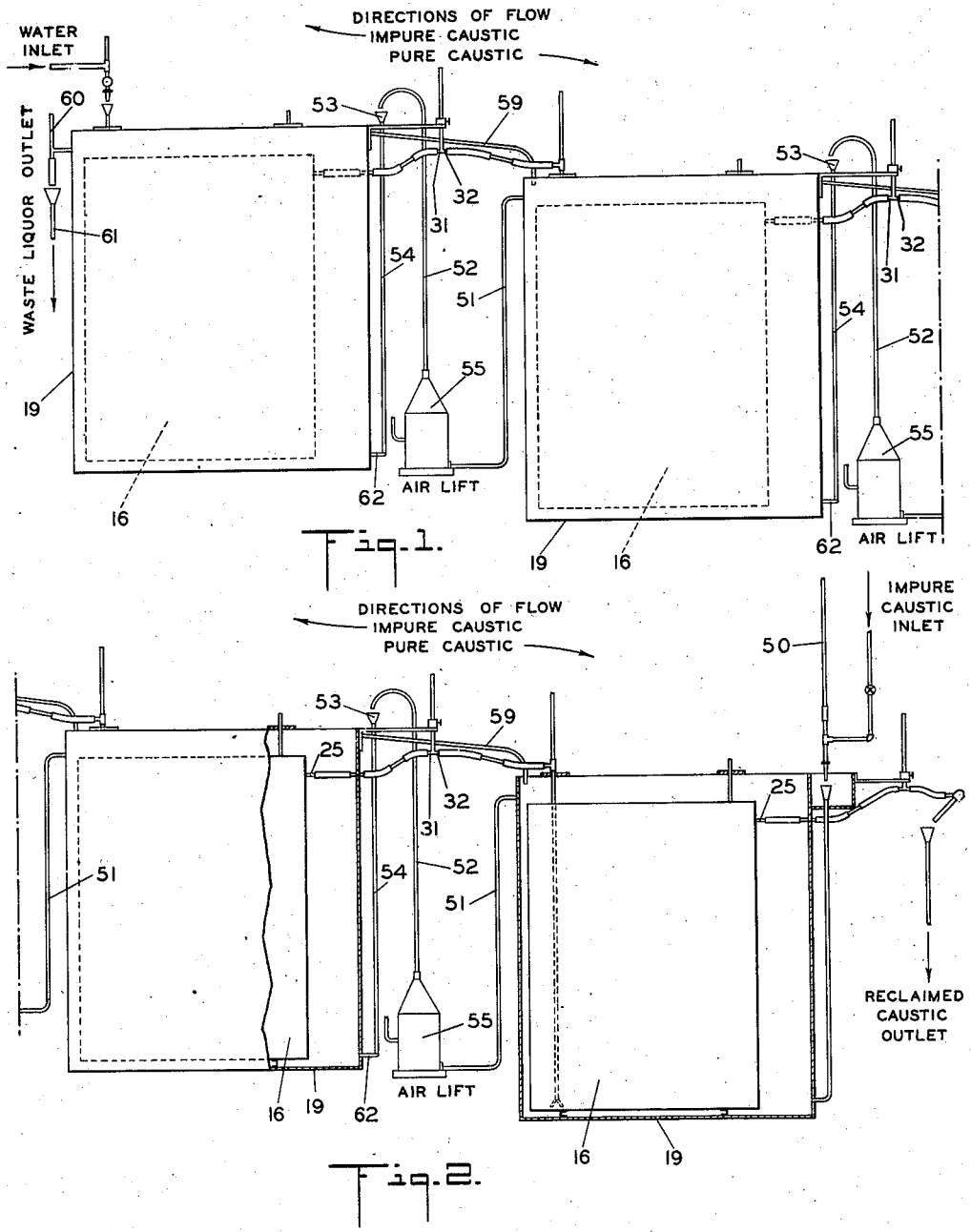

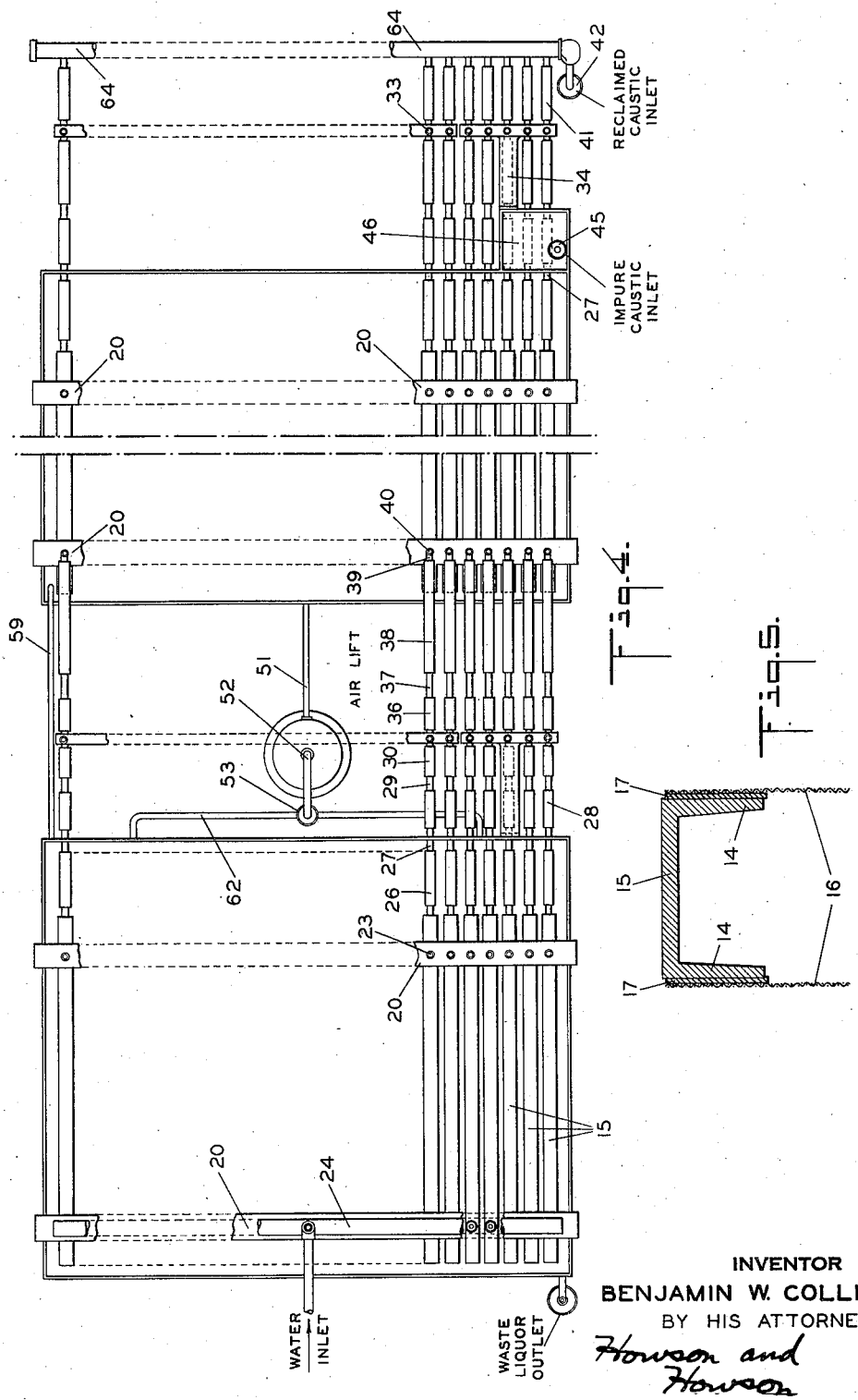

Patented Nov. 17, 1936

2,061,505

UNITED STATES PATENT OFFICE 2,061,505

APPARATUS FOR PURIFICATION OF CAUSTIC HYDROXIDE

Benjamin W. Collins, Swarthmore, Pa., assignor to The Viscose Company, Marcus Hook, Pa., a corporation of Pennsylvania Application January 3, 1935, Serial No. 308

11 Claims. (Cl. 23—252)

My invention relates to improvements in apparatus for the recovery of caustic hydroxides from impure solutions such as result from the so-called "steeping" or mercerizing of pulp in the rayon industry, or the waste caustic liquids resulting from the mercerization of yarns or the so-called "black liquor" from the digesters of pulp mills using the caustic method of cooking.

My invention contemplates the dialytic separation of caustic hydroxides from impurities such as hemi-cellulose, hydroxy celluloses, oxy-celluloses and other organic substances which may be present in impure liquors either in solution or in flocculent, jelly-like or colloidal conditions.

According to my invention, a method of mounting dialyzing membranes on their frame has been devised which provides a leak-proof, non-cracking mounting capable of absorbing sudden changes in pressures. This mounting is combined with a novel means for controlling the pressures on the membranes so as to do away with the necessity for wires or other restraining members on the inside or outside of the membranes.

In the drawings,

Fig. 1 is a diagrammatic side elevation of the first two tanks or units in a four-unit machine according to my invention, the liquid levels being omitted;

Fig. 2 is a similar diagrammatic elevation of the third and fourth tanks of the four-unit machine of Fig. 1;

Fig. 3 is a partial side elevation, partly in broken section, showing details of the cells, tanks and their connections;

Fig. 4 is a plan view of some of the connections between the tanks; while

Fig. 5 is a section through the channel iron frame and dialyzing membranes of my improved cell.

The invention will be shown and described as employed in apparatus for the removal of hemi-cellulose, etc. from impure sodium hydroxide liquor resulting from the mercerizing or steeping of wood pulp prior to crumbing an alkali cellulose in a process of producing rayon threads. In purifying caustic hydroxides for this purpose, it has been customary to employ a plurality of dialyzing cells or chambers composed partly or wholly of specially prepared canvas to act as dialyzing membranes or cloths and to pass the impure liquor through the inside of this cell or chamber and the water or pure liquid on the outside, or vice versa.

One of the troubles with caustic soda recovery machines heretofore known has been in the method of attaching the dialyzing membranes or cloths to the frame of the cell, whether the point of attachment is to a built-up frame such as shown in the Griffin Patent 1,573,703, dated February 16, 1926, or the dialyzing membranes are in the form of a bag and the mouth of the bag is fastened to the inlet for the liquor, as shown in the Cerini Patent 1,719,754, dated July 2, 1929. It has heretofore been necessary to encase the dialyzing membranes, both inside and out, with some sort of restraining means to protect them against unduly large variations in pressures. Variations in pressure tend to cause cracking of the membranes where they are attached to the frame. Even with restraining means on both sides of the membranes, cracks tend to occur. Furthermore if a wire restraining member is not present on the outside of the dialyzing member, any scratching or rubbing from an adjacent cell, as often occurs in the construction shown in the Cerini patent above-mentioned, would remove the dialyzing material from the membrane so as to destroy the dialyzing effect and cause what is termed a "leak".

A leak-proof cushion mounting of the membrane according to my invention is shown in detail in Fig. 5. According to this example, the skeleton frame 15 of the cell or dialyzing chamber consists of a square made of continuous channel iron in which the legs or side flanges 14 of the channel iron face toward the center of the square and one dialyzing membrane or cloth 16 is mounted on the outside of each leg of the channel iron frame. To mount the cloth, a thin strip of rubber 17 which, for example, may be $\frac{1}{8}''$ thick, is laid all around the four sides of the frame on one leg 14 of the iron and the membrane 16 cut to such a size that, after the shrinkage of mercerization has taken place, the cloth diaphragms would equal the size of the outside of the frame. The membrane or cloth diaphragm is laid over the rubber and the frame, rubber and membrane are then all vulcanized together in one operation. If desired, the membranes on both sides can be vulcanized on simultaneously. This not only gives the leak-proof attachment of the membrane to the frame but also gives a cushion connection so that any ordinary shock is taken up by the rubber, rather than causing a tear in the membrane. This mounting has further advantages which will be referred to later.

The arrangement of the cells is also novel. In machines such as shown in the Cerini patent above-mentioned the cells have wire protection on the outside and then are jammed together so tightly that the cloths or membranes press against each other and thus help support each other. However this has the great disadvantage that the impure caustic solution outside the cells does not have free access to the membranes and cannot circulate around all portions of the diaphragms. This, of course, cuts down the capacity of the machine and furthermore the pressure of the wire and the cloths together tends to wear out the diaphragms prematurely. Again, it is impossible to remove one Cerini cell without damaging the neighboring cells and therefore it is necessary in that machine to postpone repair of leaky cells until the entire machine is shut down. I still place the cells in my machine side by side but they are placed further apart and provide connections which make it possible to remove one cell for repair without disturbing the operation of the remaining cells. After the cell has been repaired it can be replaced so that the machine can at once return to full capacity.

In order to provide this adequate spacing between cells, I find it convenient to use a multiplicity of units or tanks 19. As part of the system for control of pressures which I have devised, I arrange these tanks in cascade formation, i. e., each tank 19 is slightly lower than the preceding tank. Thus in the drawings I have shown a machine having four tanks or units. Each cell is connected separately to a cell in the neighboring tank, each set of four connecting cells thus forming an independent series as far as concerns the descending liquid.

In the machine shown in the drawings, pure material, i. e., pure water at the start and the pure caustic after it has been passed through the machine, passes through the inside of the dialyzing cells, flowing downwardly, and is withdrawn from the cells at a point near their tops. The impure caustic, hydroxide, or what is commonly called "reject" soda, i. e., hydroxides containing hemi-cellulose, enters the machine at the bottom of the lowest tank, flows through the tank, leaves it near its upper edge and is then lifted to the next tank by any suitable means such as a gear pump, a roller pump or air lift. In the drawings the impure liquid has been shown being lifted by an air pulsometer or air lift.

Each cell rests on two small channel beams 18 lying across the bottom of the tank or unit 19. They are held in proper spaced relation from each other by two bars 20 laid across the top of the tank, each bar having a notch therein at the position for each cell. Welded into the channel iron forming the top of the cell are two pipes 22, 23, the pipe 22 being funnel-shaped at its upper end and extending to a point near the bottom of the cell. It is used for introduction of the pure water into the cell. The pipes 22 of all the cells in a tank fit into the notches in one bar 20, while the pipes 23 fit into the notches in the other bar. The pipe 23 acts merely as an air vent. Each pipe 22 has above its funnel a calibrated tip or jet on a pipe manifold 24 extending across the tank over all the cells in the first tank.

The pure water or weak caustic introduced into the bottom of each cell by the pipe 22 or pipe 40 gradually rises in the cell as it gains strength and is withdrawn from the cell by a pipe 25 near the top of the cell on the opposite side from the inlet pipe. This arrangement tends to keep the caustic inside the cell at a more uniform density without any undue distention of the membranes or diaphragms such as would result from an accumulation of the stronger caustic at the bottom if the outlet pipe opening were at that point. This discharge pipe 25 is connected to a rubber tubing 26 which stretches from the channel frame of the dialyzing chamber to a short nipple 27 passing through and welded to the wall of the tank, since this connection is submerged. On the outside of the tank this nipple 27 is connected to a short piece of rubber tubing 28. For the purpose of observing the flow of the liquid through this line, a short piece of tubing acting as a sight glass is fastened to the rubber tubing 28 coming from the nipple 27 and this sight glass is in turn connected by another piece of rubber tubing 30 to certain novel pressure regulating means.

These pressure regulating or controlling means comprise essentially means which, by adjustment of their height, can regulate the flow of pure liquid from the dialyzing chamber and which at the same time will prevent the setting-up of any siphoning action. These pressure regulating means include a T-pipe with horizontal legs 31, 32 and a third leg 33 turned upwardly. One horizontal leg 31 is fastened to the rubber tubing 30 coming from the glass tube 29, and the other horizontal leg 32 serves to carry the liquid toward the corresponding dialyzing chamber in the second tank. The upwardly extending leg 33 is open to the air and is supported by a bracket 34. The leg 33 is connected to the bracket 34 by means of a collar and set screw 35, the pipe passing through the end of the bracket and the collar and set screw resting on the upper side of the bracket. This bracket is attached to the side of the tank 19. In this way the height of the horizontal arms 31 and 32 of the T-pipe with respect to the level of the pure liquid in the corresponding cell in the first tank can be adjusted as desired, without respect to any other adjustments in the apparatus. It is preferred to keep the level of the water in each cell about up to the channel iron at the top, and by adjusting the T-pipe until it is partly above the desired level of the water, the desired amount of flow into the cell in the next tank can be obtained. Thus, when the intake from the pure water manifold 24 has been set for the desired flow, the adjustment of the T-pipe determines the level of the water in the first cell and therefore the pressure of the water on the dialyzing membrane. In this way the pressures on the inside of the dialyzing membranes on the two sides of the cell frames 15 in each first cell are accurately and individually controlled to give the desired pressure. The desired pressure is, of course, determined largely by the pressure exerted on the outside of the membranes by the impure liquor ascending through the series of tanks. It will be observed that by this balanced gravity control of the downwardly flowing liquid, one individual control for each cell gives a balanced condition for the membranes of that cell. It should also be pointed out that, starting with the lowest tank of the cascade, there is a progressive decrease of caustic concentration and, hence, density of the impure solution in each succeeding tank; and similarly, starting with the group of diaphragms into which pure water is introduced, there is a progressive increase in concentration of purified caustic with a corresponding increase in density in each succeeding group of diaphragms. Within each tank, therefore, there exists a different combination of opposed solution densities, which are overcome and between which equilibrium is maintained by means of the vertically adjustable overflow points which have just been described.

The rubber pipe 36 running from the leg 32 of the T-pipe toward the second cell conveniently connects into a short sight glass 37, another section of rubber pipe 38, and thence into a side nipple 39 on a pipe 40 leading to the inside of the corresponding cell in the second tank in the same manner as the inlet pipes 22 in the first tank. The upper end of this last-mentioned pipe is open to the air. It will now be observed that the purpose in having a T-pipe held at adjustable heights between the two tanks rather than merely holding the pipe with the liquid in it at such adjustable heights, is to provide an air vent in the line. This air vent serves to destroy any siphoning action, which of course would prevent regulation of the amount of liquid flowing from the cell in the first tank to the cell in the second tank. The cell, pipe and connections in the second, third and fourth tanks are otherwise the same as in the case of the first tank as far as concerns the connections for the pure liquid coming down the cascade system. It will be observed that any variations in speed of flow which may be necessary from cell to cell owing to change in specific gravity of the pure liquid and the increasing amount of pure soda, are obtained by the individual control which has just been described, and that any local variations or adjustments between one cell and its adjacent cell or cells in the same tank—which so often are necessary to give the proper pressures on each individual membrane—are easily obtainable. The uniformity of pressure obtained from this individually-controlled use of gravity and the individual adjustability and balancing of the membranes of each cell throughout the entire machine result in a machine of much increased efficiency. The ability of the machine to have any individual cell cut off by clamping the rubber tube connections, removing the cell, repairing and returning it to its position without stopping the operation of the remainder of the machine, results in a machine which never has to be stopped for repairs and which, except for the short time while any individual cell is being repaired, is operating with full efficiency at all times. This also represents a great practical advance.

The process of removing a cell or dialyzing chamber for repair will now be described. It will be noticed that the width of the dialyzing chamber, as shown for instance in Figs. 1 and 2, is considerably less than the width of the tank and that its normal operating position is adjacent one edge of the tank with the funnel of the pipe 22 underneath the tip 21 on the manifold 24. By clipping the rubber tubing 26 between the pipe 25 and the nipple 27 in the wall of the tank, disconnecting this rubber tubing 26 and sliding the cell to the right as it appears in Figs. 1, 2 and 3, the cell is clear of the pipe manifold 24 and can be lifted out. It will be observed that with my arrangement of parts it is necessary merely to stop the jet tip 21 and to clip only one connection to remove the cell or dialyzing chamber. The rubber tubing 26 is sufficiently long so that when returning a cell to operative position, one end of the tubing 26 can be pulled up out of the impure liquid in the tank and the connection with the pipe 25 made before the cell is lowered to a point where the pipe 25 goes below the surface of the liquid in the tank.

The arrangement in the second, third and fourth tanks is the same as in the first tank except that instead of the funnel-shaped inlet pipe 22 positioned underneath the nipple on the pipe manifold 24, there is no manifold and the pure liquid for each chamber comes from its own associated chamber in tank 1 through the vented inlet pipe above mentioned. Here again the vent gives a chance for any excess air which may have gotten into the line at the T-pipe to escape to the open air.

The discharge nipple 27 in the wall of the fourth or last tank is connected to an adjustable pressure control T-pipe bracket mechanism 34 as in the case of the previous tanks. After the T-pipe on the fourth unit or tank there is a rubber tube connection 41 to a pipe manifold 64 lying across the end of the entire tank which takes the recovered or pure soda and drops it into a funnel 42 of a pipe 43 leading away to a tank (not shown) where the recovered liquid is kept.

The means for causing the impure liquid to pass through the cascade in an upward direction will now be described. The impure liquor is introduced into the bottom of the lower tank at one end by a pipe 44 which extends from the bottom of the tank upwardly on the outside ending in an upwardly directed funnel 45. This funnel lies in a small open-top iron box 46 fastened on the outside of the tank, which box extends a few inches above the top of the funnel 45. The T-pipe control bracket 34 is on this box. Above the funnel 45 is a discharge tip or jet 47 to which the impure soda solution is brought by the pipe 48 with a valve 49. Next to one side of this pipe 48 is a calibrated vertical gauge glass 50 which gives an accurate means of determining the pressure with which the impure soda is passing out of the jet into the system. By having the top of the funnel 45 at the level at which it is desired to keep the impure liquor surrounding the dialyzing chambers in the last tank, it will be observed that the apparatus just described will serve to keep the level substantially uniform at all times.

In the construction shown in the drawings, the impure liquor leaves the last tank at the top at a point midway between the ends and falls by gravity through a pipe 51 to suitable pumping means for introducing it to the next higher tank. The pumping means sends it up through a pipe 52 which drops it into a funnel 53 above the top of the higher tank, which funnel leads the liquid down through a pipe 54 into the next higher tank. In the drawings there is a manifold 62 on pipe 54 giving two points of introduction into the subsequent tanks spaced equally apart and from the ends of the tank.

While I can use a roller pump or a gear pump to raise the liquor, I find it preferable to rely on the influence of gravity for raising the impure liquor as well as for causing the purified liquor to descend through the system. To avail of gravity for this purpose I employ what is known as an air lift. This comprises a bottle 55 having three outlets 56, 57, 58. The outlet 57 at a middle level in the side of the bottle serves to introduce a steady stream of air bubbles which of course can be regulated as desired. The second outlet 56 is connected to the pipe 51 coming from the lower tank, while the third outlet 58 at the uppermost point of the bottle is connected to the pipe 52 which leads to the funnel above the higher tank. Preferably the bottle is tapered at its upper portion. Projecting downwardly a short distance into the bottle from the pipe 52 is a tube 63 with bevelled end. The air bubbles rising through the solution collect in the neck of the bottle and the air escapes intermittently through the tube 63 into the vertical pipe 52 leading to the higher tank. These bubbles trap some of the liquid and force it up the pipe ahead of them. The pipe coming from the lower tank may be termed the solid liquid inlet column, and the pipe 52 leading to the higher tank may be termed the output liquid column broken up by air bubbles. By having this output column not more than three times the height of the solid input column and presenting compressed air through the air inlet at a pressure of from four to six pounds, the air bubbles will force their way through the output column intermittently, carrying with them small portions of the impure liquor. This air lift form of pumping maintains the liquor levels in the succession of tanks in a very successful manner.

As a safety device in case any of the air lifts or the intake at the bottom tank are furnishing liquor to any one of the higher tanks at too high a speed, an overflow pipe 59 is located at the proper level near the top of each tank, which leads to the next lower tank. By means of these overflow pipes any excess is kept in the lowermost tank and the operator need watch only the box 46 in which the funnel for determining the level in the lowest tank is located, to assure himself that the liquid is flowing through all tanks at a net satisfactory rate. The level in this box, together with the calibrated gauge glass 50 just above it and the valve therefor, give a uniform control of the impure liquor as it is lifted throughout the whole system by gravity.

As already explained, the impure liquor enters each tank at the bottom midway at one side and leaves it at the top midway at the other side. At the discharge point in the highest tank a discharge pipe 60 is located which leads to a funneled waste pipe 61. The discharge pipe 60 has a T-end open to the air to prevent any siphoning action.

In the drawings I have shown no means for supplying air bubbles to the air lift pumps, as any air supply mechanism with suitable regulating valve can be used. In the drawings the liquid levels have been omitted for the sake of clarity, but by comparison of the levels of the various parts, suitable limits for the various levels will be obvious. It will also be obvious that any number of tanks or any number of cells in any tank can be used without departing from my system of individual connections for the descending liquor so as to give sets of cells and dialyzing chambers with paths of travel from a cell or cells in one tank to a corresponding cell or cells in each of the lower tanks. Similarly of course the impure liquid can be caused to descend the cascade and the pure water, which becomes the purified liquor, can be caused to ascend through the system, but I find it preferable to have the impure liquor do the ascending.

I find that by the apparatus described a machine is provided in which the entire surface of the dialyzing membrances is exposed to liquids without restraint of wires, etc., thus getting full efficiency from the membrances; that the machine can be running continuously at full efficiency without stoppage for repairs; and that accurate control of the pressures of the two liquors is obtained to give individual balancing of the pressures on the membranes of each cell so as to give full efficiency in each cell and avoid damage to the membranes. Further, the manner in which I attach my membranes to the other elements forming my cell or dialyzing chamber gives a stronger, non-leaking, shock-proof attachment of the membranes and yet one which at the same time permits easy and quick replacement of any membrane which may become damaged.

What I claim is:

1. A cell for dialytic apparatus comprising a frame, a dialyzing membrane and rubber between the frame and membrane, said three elements being vulcanized together.

2. A cell for dialytic apparatus comprising an open frame, a layer of rubber on one side of said frame and a dialyzing membrane on the rubber covering one side of the frame, the frame, rubber and membrane being vulcanized together.

3. A cell for dialytic apparatus comprising a metal frame, a rubber cushion on the frame and a dialyzing membrane on the cushion, said three elements being vulcanized together.

4. A cell for dialytic apparatus comprising a skeleton frame having continuous side flanges, and a dialyzing membrane on each flange of the channel iron frame enclosing its side of the cell, in combination with a layer of rubber on each leg of the frame between the frame and the adjacent membrane, said frame, rubber and membranes being vulcanized together in one operation.

5. In dialytic apparatus, a tank containing a plurality of dialytic cells, each dialytic cell comprising a frame and at least one dialytic membrane, in combination with elastic material between said frame and said membrane, said frame, elastic material and membrane being vulcanized together, and connections regulating the flow from each cell.

6. In dialytic apparatus, a plurality of tanks arranged in cascade and a plurality of dialytic cells in each tank, in combination with a vertically adjustable connection from each cell to the next cell in the series adapted to retard the gravity flow from one cell to the next lower cell so as to produce the desired pressure in the higher cell, and an air vent in said vertically adjustable means to prevent siphoning.

7. In dialytic apparatus, a plurality of tanks arranged in cascade, a plurality of dialytic cells in each tank and a manifold for feeding liquid to all the cells in the highest tank, in combination with a plurality of vertically adjustable gravity connections each independently regulating and delivering the discharge from one cell to another cell in the next tank, thus creating separate series of cells in cascade, said cells being spaced in said tanks a sufficient distance apart to permit removal of one cell without touching its neighbors.

8. In dialytic apparatus, a plurality of tanks arranged in cascade and a plurality of dialytic cells in each tank, individual means connecting each cell to one in the next lower tank, thus creating a plurality of series of cells side by side, said individual means each comprising a vertically adjustable gravity overflow discharge adapted to control the height of the liquid in the upper cell.

9. In dialytic apparatus, a plurality of tanks arranged in cascade and a plurality of dialytic cells in each tank, each dialytic cell comprising a frame and at least one dialytic membrane, in combination with elastic material between said frame and said membrane, said frame, elastic material and membrane being vulcanized together, and individual control means connecting the inside of each cell with the inside of a cell in the next lower tank, said individual means each comprising gravity overflow discharge vertically adjustable to balance the pressures on the inside and outside of the membrane of the upper cell.

10. In dialytic apparatus, a plurality of tanks arranged in cascade, and a plurality of dialytic cells in each tank, in combination with an individual discharge control means for each of a plurality of cells, each means being adjustable to regulate the height of liquid inside the cell and discharging into a single cell in the next lower tank, separately controlled means for pumping the liquid in each tank to the next higher tank, and overflow means maintaining constant the level of the liquid in the tank.

11. In dialytic apparatus, a plurality of tanks arranged in cascade, and a plurality of dialytic cells in each tank, in combination with an individual discharge control means from each cell vertically adjustable to regulate the height of the liquid inside the cell and discharging into a single cell in the next lower tank, a plurality of adjustable air lift means each employing bubbles to lift from one tank to another the liquid flowing around the outside of the dialytic cells in a tank, and overflow means maintaining constant the level of the liquid in the tank.

BENJAMIN W. COLLINS.